United States Patent [19]
Stachiw et al.

[11] 4,150,875
[45] Apr. 24, 1979

[54] PRESSURE-RESISTANT HOUSING

[75] Inventors: Jerry D. Stachiw, Lakeside; George M. Horn, San Diego, both of Calif.

[73] Assignee: The United States of America as represented by the Secretary of the Navy, Washington, D.C.

[21] Appl. No.: 836,255

[22] Filed: Sep. 23, 1977

[51] Int. Cl.² .............................................. G02B 5/00
[52] U.S. Cl. ..................................... 350/319; 114/340
[58] Field of Search ....................... 350/319, 301; 89/5, 89/41.6, 6.5; 114/16 B, 16 C; 220/328; 73/334; 52/84

[56] References Cited

U.S. PATENT DOCUMENTS

| | | | |
|---|---|---|---|
| 2,688,506 | 9/1954 | Bakker | 114/16 C |
| 3,262,364 | 7/1966 | Kollomorgen | 350/301 |
| 3,611,970 | 10/1971 | Hagan et al. | 350/319 |
| 3,951,301 | 4/1976 | Meginnes | 350/319 |
| 3,989,360 | 11/1976 | Duchet | 350/319 |

FOREIGN PATENT DOCUMENTS 498585  4/1976  U.S.S.R. .................................. 350/319

Primary Examiner—John K. Corbin
Assistant Examiner— delos Reyes
Attorney, Agent, or Firm—Richard S. Sciascia; Ervin F. Johnston; James O. Skarsten

[57] ABSTRACT

In a housing which is transparent to light of selected wavelength, a hyperhemispherical window of selected dimensions is formed of material which is transparent to light of the selected wavelength, the window having a seating surface. The window is supported by a mounting means, which has a bearing surface in abutting relationship with the seating surface of the window, and a compressible retaining means adjacent to the window and to the mounting means retains the window in immovable relationship with the mounting means, while sealing the window against external and internal pressures thereupon.

16 Claims, 8 Drawing Figures

FIG. 5.
FIG. 7.
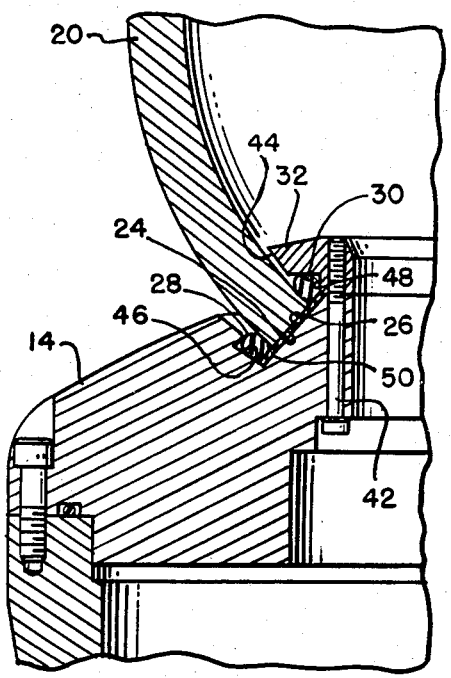
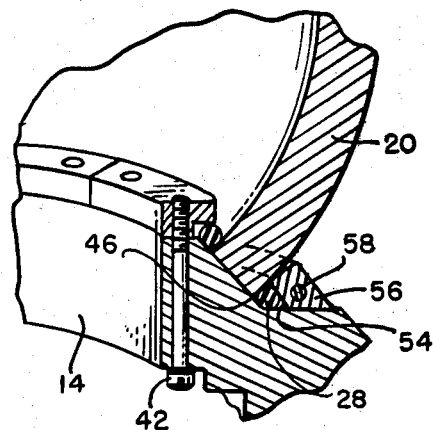
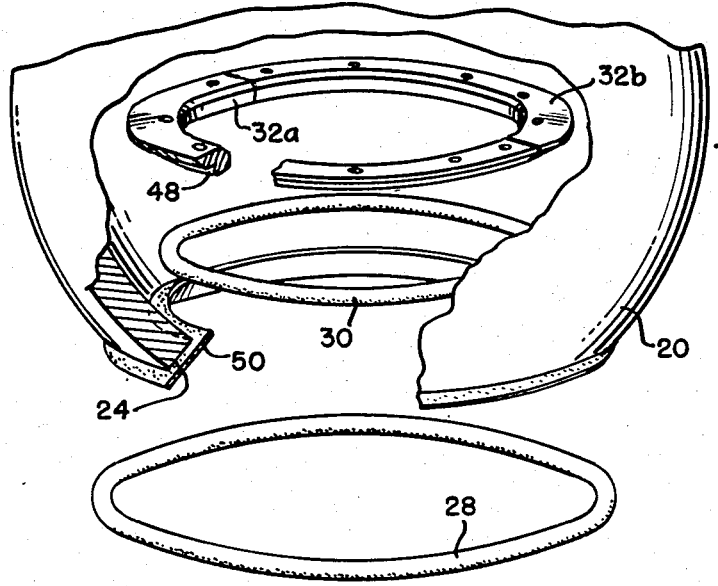
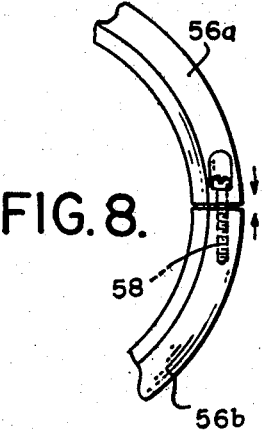
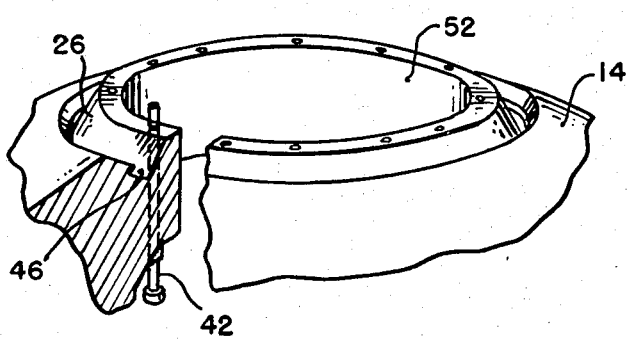
FIG. 8.
FIG. 6.

PRESSURE-RESISTANT HOUSING

BACKGROUND OF THE INVENTION

The present invention pertains generally to the field or art of fabricating a housing which is transparent to light of selected wavelength. More specifically, the invention pertains to the fabrication of a housing for selected electro-optical equipment which requires the joining of a selectively shaped window of glass or other brittle material with a mounting of metallic material. Even more specifically, the invention pertains to the fabrication of a housing which includes a hyperhemispherical-shaped window and which may be employed to house a periscope or other device for a submarine.

The importance of a periscopic viewing device for the operation of submarines for military or other purposes is quite well known. Presently used periscopes generally comprise a system of lenses and mirrors enclosed in a tubular housing, which penetrates the hull of any submarine with which it is used in order to provide a path for received optical images. As is well known in the field of naval architecture, physical penetration weakens a submarine hull and reduces the resistance thereof to hydrostatic pressure.

In addition, certain presently used periscopes include a housing which is of circular cross-section so as to be rotatable about the longitudinal axis of the housing. Such rotation is necessary to enable view of a 360° azimuth. However, a housing of circular cross section is not hydrodynamically streamlined, and increases wake and resistance to travel through water. Also, the wear on a mechanically rotatable housing may be substantial.

It has been recognized that the above disadvantages may be overcome by providing a periscope housing which includes a window of selected shape or configuration constructed from material which is transparent to light. The window could be joined to a mounting to enclose electro-optical viewing equipment, along with electromechanical equipment to maneuver the viewing equipment through a selected azimuth and angle of elevation. All movement required to view an object would thereby take place within the housing. Required power and control signals to the equipment and information therefrom could be coupled through electric cable, whereby very minimal penetration of a submarine hull would be required.

However, in fabricating a housing of the above type, it would most likely be necessary to sealably join a window of glass or similar brittle material with a mounting of metal, such as steel or titanium. Since the respective thermal coefficients of such joined materials are very different, their respective rates of flexure differ substantially as the joint therebetween is subjected to increasing pressure, leading to possible failure of the brittle material.

SUMMARY OF THE INVENTION

The present invention provides a housing which is transmissive to radiation of selected frequencies and includes a window which is shaped or configured in the form of a segment of a sphere, the window being provided with a seating surface. The invention further includes a mounting means for supporting the window, the mounting means having a bearing surface in abutting relationship with the seating surface of the window, and a compressible retaining means adjacent to the window and to the mounting means for retaining the window in immovable relationship with the mounting means.

In a useful embodiment of the invention, the window comprises a material which is transparent to light of selected wavelength, the mounting means comprises a metallic material and the retaining means includes first resilient means for resisting external pressure upon the window, and second resilient means for resisting internal pressure therewithin. The first and second resilient means is adapted to retain the window by means of friction force applied upon internal and external surfaces, respectively, of the window. By being compressible, the retaining means provides compensation for different flexure rates of the window and mounting means along a joint therebetween, as the joint is subjected to varying pressure.

Preferably, the window comprises a hollow hyperhemisphere, or spherical segment which is greater than a hemisphere and less than an entire sphere. The hyperhemispherical window is of selected outside and inside diameter, and an access opening thereinto is surrounded by the aforementioned seating surface, the seating surface lying upon a spherical angle which has its apex at the center of the hyperhemispherical window.

An embodiment of the invention may be usefully employed in a periscopic viewing device for a submarine, electro-optical viewing apparatus being contained therein. The viewing apparatus is maneuvered to view an object at a selected azimuth and elevation angle by electro-mechanical means, which are also contained within the housing as aforementioned. Consequently, the housing may be immovably attached to a submarine, for example, by means of a mast positioned between the submarine and the mounting means, and the mounting means may be provided with a hydrodynamically streamlined shape. The viewing apparatus may, for example, be capable of viewing light in the visible region, the window being of material such as glass or acrylic, or may be capable of viewing light in the infrared region, the window being of material such as germanium. It will be readily apparent that, in addition to housing radiation sensing equipment, an embodiment of the invention may be employed to house radiation transmitting equipment, for example, to provide a light beacon.

While it is believed that the present invention may be usefully embodied or employed as above stated, it is not intended to limit the invention thereto.

OBJECTS OF THE INVENTION

An object of the invention is to provide an improved housing which comprises a window joined to a mounting, the window being transmissive to radiation of selected frequencies, and the joint between the window and the mounting being sealed to resist extreme external pressures thereupon.

Another object is to provide an improved means for sealably joining a hyperhemispherical window and a mounting therefor, wherein the materials respectively used to form the window and mounting have very different thermal coefficients, and the joint therebetween is subjected to extreme external pressures.

Another object is to provide an improved housing which comprises a hyperhemispherical window of glass, germanium, or other brittle material and a mounting of metallic material, wherein means used to join the window and the mounting must be capable of resisting a selected pressure contained within the housing, and extreme hydrostatic pressures external thereto.

Another object is to provide an improved periscope or other viewing device for a submarine, which requires minimum penetration of the submarine hull.

Another object is to provide an improved periscope or other viewing device for a submarine, which may view an object through a selected azimuth and elevation angle, while the periscope housing remains stationary with respect to the submarine.

Another object is to provide an improved periscope or other viewing device for a submarine which includes a hyperhemispherical-shaped window and a mounting of hydrodynamically streamlined shape.

These and other objects of the invention will become more readily apparent from the ensuing specification when taken together with the drawings.

BRIEF DESCRIPTION OF THE DRAWINGS

FIG. 5 is an enlargement of a portion of FIG. 3.

FIG. 6 is an exploded isometric view of the embodiment of FIG. 1, a portion thereof being broken away.

FIG. 7 is an isometric view showing an holding ring employed in a modification of the embodiment of FIG. 1.

FIG. 8 is a plan view showing a fastening means for the external ring of FIG. 7.

DETAILED DESCRIPTION OF THE PREFERRED EMBODIMENT

Figure 1:
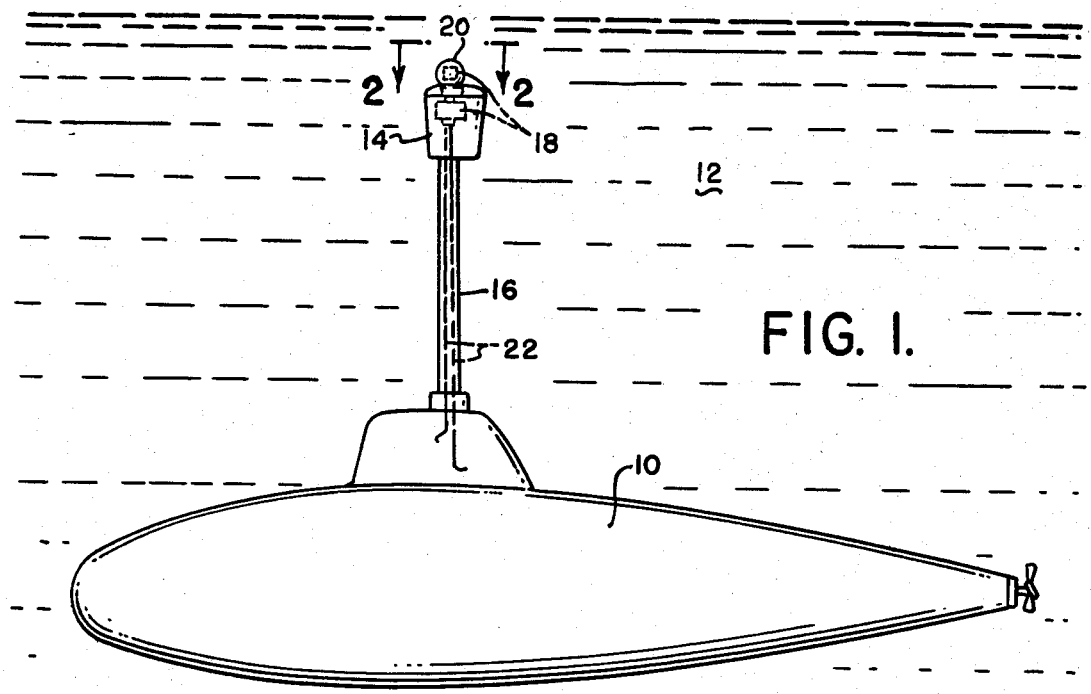
FIG. 1 is a perspective view showing an embodiment of the invention employed by a submersible vehicle in a marine environment.

Referring to FIG. 1, there is shown a submarine or other submersible vehicle 10 in a marine environment 12, a mounting 14 being immovably joined thereto by means of a mast 16 which does not penetrate the hull of submarine 10. Mounting 14 is formed from a metal such as aluminum or titanium, and is provided with a hydrodynamically streamlined shape, the external contours of mounting 14 being designed to minimize resistance to travel through water. Equipment 18, which is employed by submarine 10, is enclosed in a housing formed by immovably joining a window 20, comprising a hollow hyperhemisphere, to mounting 14, by means hereinafter described. Window 20 is formed from material which is transparent or highly transmissive to light or other radiation over a selected range of wavelength or frequency, and equipment 18 includes one or more devices for sensing and/or transmitting radiation over the selected range.

Referring further to FIG. 1, there are shown cables 22, such as electric or fiber optic cables, coupled between submarine 10 and equipment 18 to provide communication therebetween. It may be noted that the penetration of the hull of submarine 10 required for cables 22 is very minimal.

Figure 2:
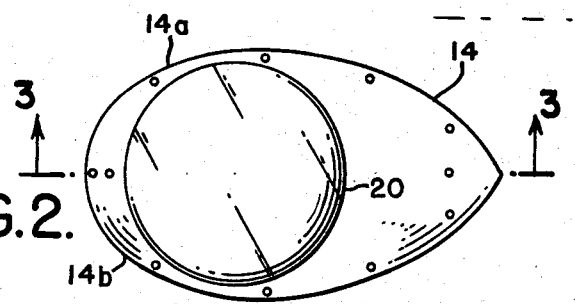
FIG. 2 is a plan view of the embodiment of FIG. 1 taken on line 2—2 of FIG. 1.

Referring to FIG. 2, there is shown mounting 14 having side surfaces 14a and 14b which are curved to hydrodynamically streamline mounting 14 as aforementioned, minimizing drag and wake thereof when mounting 14 moves through environment 12.

Figure 4:
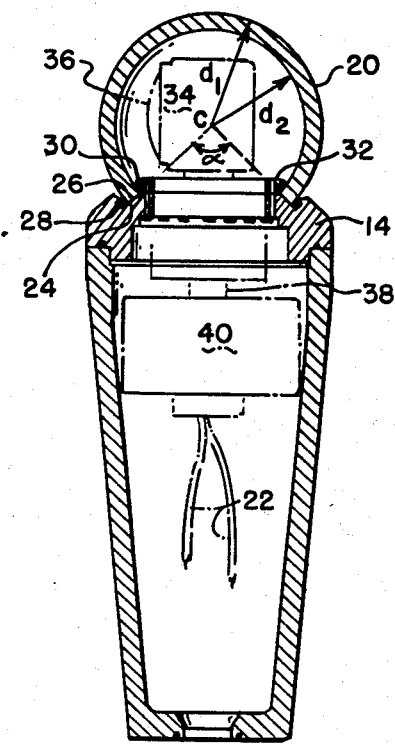
FIG. 4 is a sectional view of the embodiment of FIG. 1 taken along line 4—4 of FIG. 3.
Figure 3:
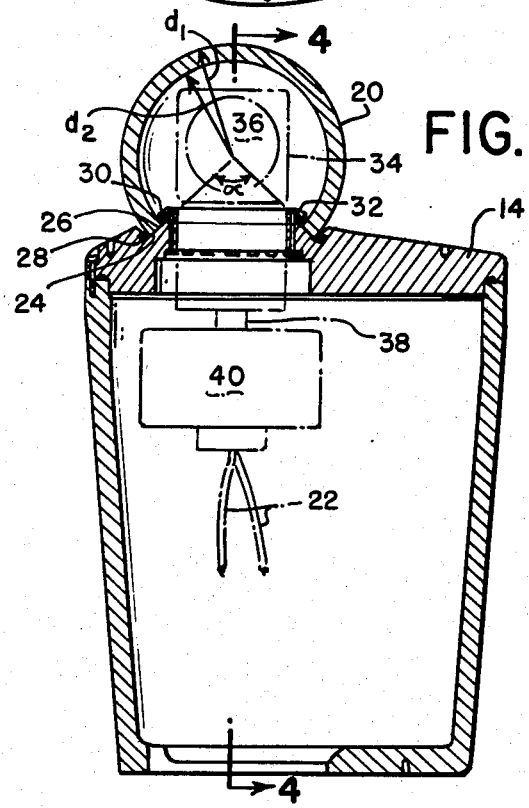
FIG. 3 is a sectional view of the embodiment of FIG. 1 taken on line 3—3 of FIG. 2.

Referring to FIGS. 3 and 4, there is shown window 20 comprising a hollow hyperhemisphere which has its center at C, an outside diameter of $d_1$, and an inside diameter of $d_2$, where $d_1$ is approximately 10 inches and $d_2$ is approximately 8.5 inches. An access opening into window 20 is defined by a spherical angle $\alpha$ having its apex at C, where $\alpha$ usefully is 90° to 96°, and the portion of window 20 which lies on spherical angle $\alpha$ comprises an annular seating surface 24 which surrounds the access opening. Mounting 14 is provided with an annular groove, one side of which comprises a flat bearing surface 26 to match seating surface 24 of window 20, and window 20 is supported by mounting 14, seating surface 24 being in abutting relationship with bearing surface 26.

Referring further to FIGS. 3 and 4, there is shown a compressible retaining means, described hereinafter in greater detail, which comprises a first resilient means 28, second resilient means 30 and holding means 32. FIGS. 3 and 4 also show equipment 18 including an element 34 which may comprise a viewing device which has a lens 36 and which is mechanically coupled by means of a linkage 38 to an electromechanical drive 40. Drive 40 comprises an electric motor or the like, and receives power and control signals from submarine 10 through cables 22 to maneuver lens 36 through a 360° azimuth and an elevation angle in excess of 90°, enabling device 34 to view or sense radiation from a selected object.

Device 34 may comprise, for example, a conventional electro-optic device for viewing light images having wavelengths in the visible range, 0.4–0.7 microns, the device converting viewed images into electrical information which is coupled to submarine 10 through a cable 22. For such application, window 20 would be formed from material such as glass or acrylic.

Alternatively, viewing device 34 could comprise a conventional electro-optic device for viewing or sensing images having wavelengths in the infrared range, 1.8–23 microns. For such application, window 18 would be formed from material such as germanium.

Consistent with the principles of the present invention, element 34 could comprise a device for radiating or transmitting radiation of selected frequency or wavelength, window 20 being formed of material transmissive thereto. For example, the housing formed by window 20 and mounting 14 could be employed to enclose a light beacon or communication equipment.

Referring to FIG. 5, there are shown resilient means 28 and 30 comprising respectively, external and internal O-rings of compliant material, and holding means 32 comprising a ring which is joined to mounting 14 by means of a plurality of bolts 42. Ring 32 has an outer edge 44 which is shaped and dimensioned to match the inside curvature and dimensions of window 20 in proximity to seating surface 24.

Referring further to FIG. 5, there is shown the aforementioned annular groove of mounting 14 configured to provide an annular channel 46, for receiving external O-ring 28. Similarly, ring 32 is configured to provide an annular channel 48 for receiving internal O-ring 30. The dimensions of channels 46 and 48 are respectively selected with respect to O-rings 28 and 30 so that O-ring 28 is compressed between mounting 14 and the external surface of window 20, and O-ring 30 is compressed between mounting 14, the internal surface of window 20, and ring 32, when bolts 32 are tightened. Compressed O-ring 28 is capable of sealing window 20 against hydrostatic pressure thereupon in excess of 1000 psi, and compressed O-ring 30 is capable of resisting internal pressure within window 20 which is normally 5 psi. In addition, compressed O-rings 28 and 30 retain window 20 in immovable relationship with mounting 14 by applying friction force upon adjacent portions of the external and internal surfaces, respectively, of window 20.

FIG. 5 also shows a gasket 50 positioned between seating surface 24 and bearing surface 26 for resisting wear therebetween.

Referring to FIG. 6 there is shown ring 32 comprising a split ring of two segments 32a and 32b, and there is further shown mounting 14 having an opening 52 therethrough. The several components of the present embodiment may be assembled by first positioning external O-ring 28 in channel 46 and seating surface 24 of window 20 upon bearing surface 26 of mounting 14. Gasket 50 being positioned therebetween. Then, by reaching through opening 52 internal O-ring 28 and split ring 32 are positioned, and bolts 42 are tightened to compress O-rings 28 and 30.

Referring to FIG. 7, there is shown a modification of the invention, wherein annular channel 48, which receives external O-ring 28 as aforementioned is partially formed by an edge of a ring 56, comprising a plurality of segments which is variably tightened around the external surface of window 20 in proximity to sealing surface 24. By providing segmented ring 56, respective tolerances required to mate window 20 and mounting 14 become greater, whereby manufacturing costs may be reduced.

Referring to FIG. 8, there are shown segments 56a and 56b of ring 56, which are joined by means of adjustable screw 58 passing through matching threaded holes in segments 56a and 56b.

Obviously, many modifications and variations of the present invention are possible in the light of the above teachings, and, it is therefore understood that within the scope of the disclosed inventive concept, the invention may be practiced otherwise than as specifically described.

What is claimed is:

1. A housing which is transmissive to radiation of selected frequencies comprising:
   a hyperhemispherical window which is provided with a seating surface, said seating surface being frustoconical;
   mounting means for providing forces to support said window and to resist extreme external pressure applied to said window, said mounting means having a frustoconical bearing surface in abutting relationship with said frustoconical seating surface of said window, said frustoconical bearing surface for transmitting all of said supporting and pressure resisting forces from said mounting means to said frustoconical seating surface of said window;
   compressible means adjacent to said window and to said mounting means for sealing said window against external pressure and
   holding means contained within said hyperhemispherical window for compressing said compressible means to seal said window, and for retaining said frustoconical seating surface of said window in immovable abutting relationship with said frustoconical bearing surface of said mounting means.

2. A housing which is transmissive to radiation of selected frequencies comprising:
   a hyperhemispherical window which is provided with a seating surface and which comprises a material transparent to light of selected wavelength;
   mounting means for supporting said window, said mounting means having a bearing surface in abutting relationship with said seating surface of said window, said mounting means comprising a metallic material;
   an external O-ring of compliant material positioned between said mounting means and the external surface of said window for resisting external pressure upon said window;
   an internal O-ring of compliant material contained within said window for sealing said window against internal pressure within said window; and
   holding means comprising a holding ring which abuts said internal O-ring and which is immovably secured to said mounting means to compress said internal O-ring between the internal surface of said window and said holding ring, and to compress said external O-ring between the external surface of said window and said mounting means.

3. The housing of claim 2 wherein:
   said holding ring comprises a split ring;
   an opening through said mounting means communicates with the interior of said window, the dimensions of said opening being sufficiently large to enable each component of said split ring to be positioned in abutting relationship with said internal O-ring and to be immovably secured to said mounting means; and
   viewing equipment positioned at the center of said window is enabled to view an object through an azimuth of 360° and through an elevation angle in excess of 90°.

4. The housing of claim 3 wherein:
   said seating surface of said window lies upon a spherical angle, the apex of said spherical angle being located at the center of said window.

5. The housing of claim 3 wherein:
   said split ring has an outside edge which is shaped and dimensioned to match inside curvature and inside dimensions of said window in proximity to said seating surface.

6. The housing of claim 2 wherein:
   a segmented ring is variably tightened around the external surface of said window in proximity to said seating surface.

7. A housing for equipment employed by a submersible vehicle at a location external to the hull of the vehicle, said housing being immovably joined to said vehicle by means of a mast which does not penetrate the hull of the vehicle, said housing comprising:
   a hollow hyperhemispherical window which is provided with a seating surface;
   mounting means for supporting said window and for joining together with said window to enclose said equipment, said mounting means having a bearing surface in abutting relationship with said seating surface of said window; and
   a compressible retaining means adjacent to said window and to said mounting means for retaining said window in immovable relationship with said mounting means.

8. The housing of claim 7 wherein:
   said window comprises a material which is transparent to radiation of selected wavelength;

said mounting means comprises a metallic mounting having a hydrodynamically streamlined shape; and said retaining means includes first resilient means for resisting hydrostatic pressure in excess of 1000 psi upon said window and second resilinet means for resisting internal pressure within said window.

9. The housing of claim 8 wherein:

said equipment includes a device for sensing radiation over a selected range of wavelengths, said window being formed of material which is transparent to radiation in said range.

10. The housing of claim 8 wherein:

said equipment includes a device for viewing visible light images and said window comprises glass.

11. The housing of claim 8 wherein:

said equipment includes a device for viewing infrared images and said window comprises germanium.

12. The housing of claim 8 wherein:

said equipment includes a device for transmitting radiation over a selected range of wavelengths, said window being formed of material which is transparent to radiation in said range.

13. The housing of claim 7 wherein said retaining means comprises:

an external O-ring of compliant material compressed between said mounting means and the external surface of said window;

an internal O-ring compressably contained within said window adjacent to the joint between said seating surface and said bearing surface; and holding ring contained within said window which abuts said internal O-ring and which is immovably secured to said mounting means to compress said external O-ring and said internal O-ring.

14. The housing of claim 7 wherein:

a gasket is positioned between said seating surface and said bearing surface for resisting wear between said seating surface and said bearing surface.

15. The housing of claim 7 wherein:

said window comprises material which is transparent to light having wavelengths in the range 0.4–0.7 microns.

16. The housing of claim 7 wherein:

said window comprises material which is transparent to light having wavelengths in the range 1.8–23 microns.

* * * * *